Figure 1:
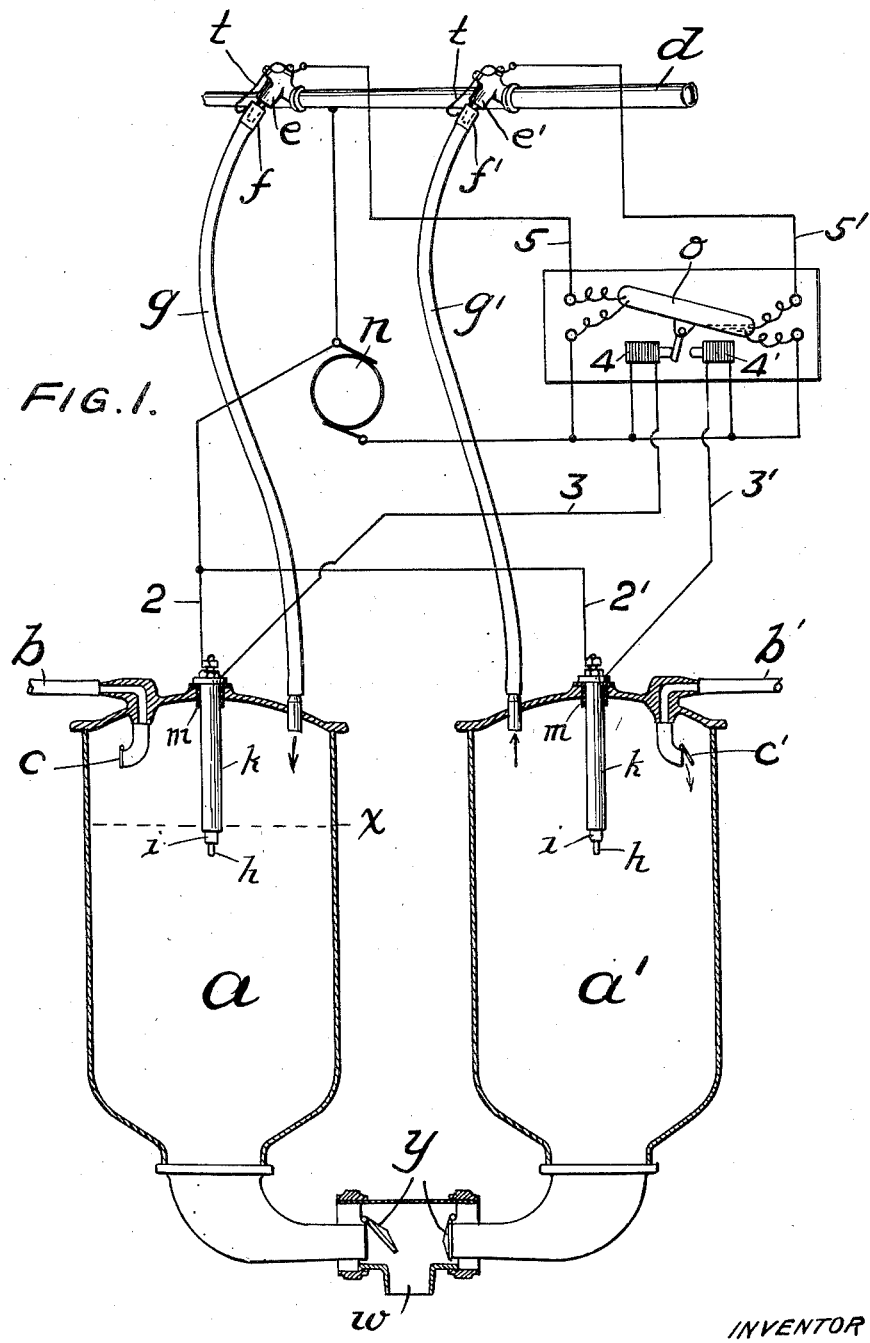

June 12, 1934.   C. H. HAPGOOD   1,962,192
CONTINUOUS MILK DELIVERY SYSTEM
Filed Oct. 29, 1931   2 Sheets-Sheet 1

WITNESS:
Rob P. Kitchel.

INVENTOR
Cyrus Howard Hapgood
BY
Busser and Harding
ATTORNEYS.

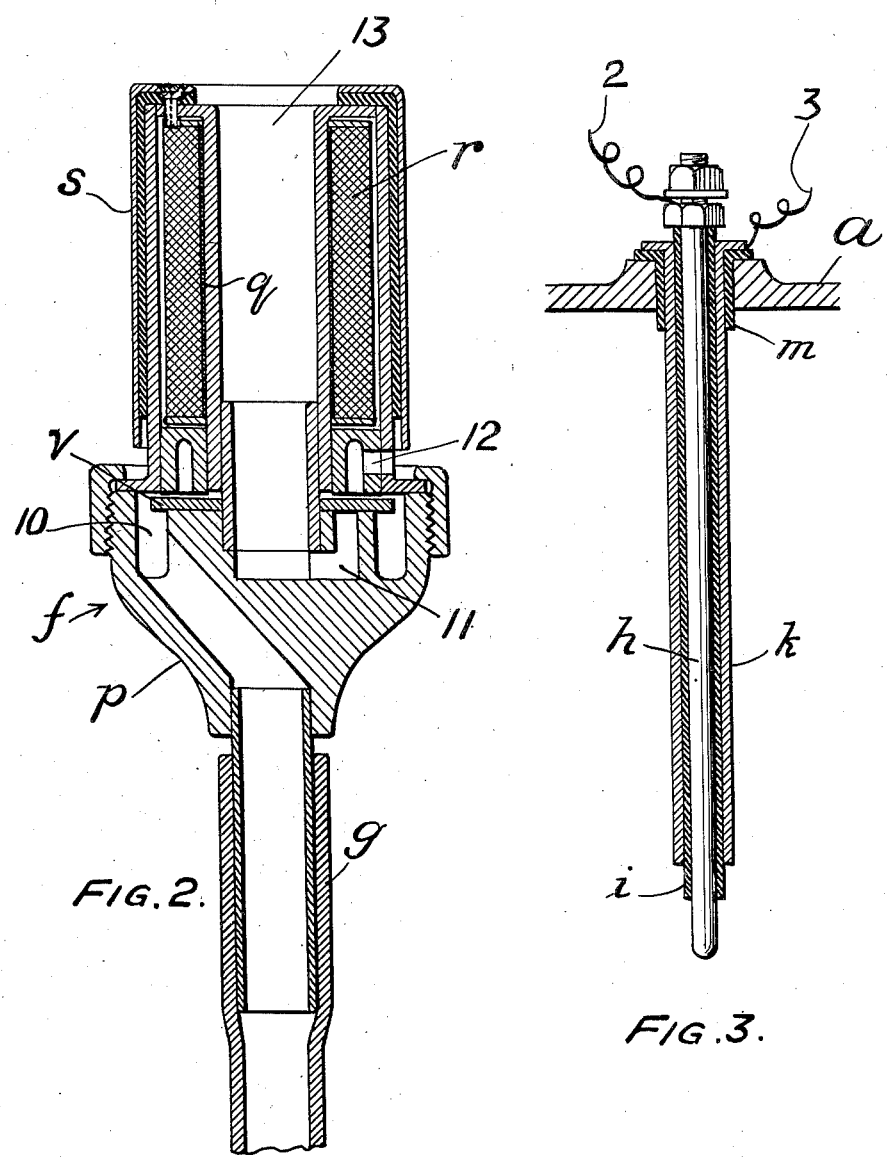

Patented June 12, 1934

1,962,192

UNITED STATES PATENT OFFICE 1,962,192

CONTINUOUS MILK DELIVERY SYSTEM

Cyrus Howard Hapgood, Nutley, N. J., assignor to The De Laval Separator Company, New York, N. Y., a corporation of New Jersey Application October 29, 1931, Serial No. 571,751

4 Claims. (Cl. 31—82)

In a patent issued to me, July 7, 1931, No. 1,813,238 and also in an application filed by me June 13, 1931, Ser. No. 544,109, there is disclosed a continuous milk delivery system comprising a pair of tanks, a milk inlet to both tanks, a source of partial vacuum, and pneumatically operating mechanism whereby, when either tank is connected with said source of partial vacuum to induce the flow of milk thereinto, the other tank is connected with atmosphere to expel the milk therefrom. The object of the present invention is to effect the same operation by simplified means, mainly electrical. A preferred embodiment of the invention is shown in the drawings, wherein—

Fig. 1 is a sectional elevation, partly in diagram, of the apparatus. Fig. 2 is a sectional view of one of the valves controlling the connection of the corresponding tank with vacuum and atmosphere. Fig. 3 is a detail view of the circuit closing device controlling the reversal of the connection of the tanks with atmosphere and vacuum.

The two milk receiving tanks or cans $a$ and $a'$ may be identical in construction.

The milk from the teat cups of any milking machine (not shown) flows through a main milk outflow pipe (not shown) into and through either branch pipe $b$ or $b'$ to the corresponding tank $a$ or $a'$. On the discharge end of each branch pipe is a valve $c$ or $c'$ which opens when the corresponding tank is under suction (partial vacuum) and closes when the corresponding tank is under atmospheric or other relatively high pressure.

Secured to a main vacuum pipe $d$ connected with a vacuum pump or other source of partial vacuum are nozzles $e$ and $e'$ to which are connected connectors $f$ and $f'$ on the ends of hose $g$ and $g'$ communicating with the tanks $a$ and $a'$. Each connector carries an electrically controlled valve, shown in detail in Fig. 2, which is movable to connect the corresponding hose with either vacuum or atmosphere.

Secured to the top or cover of each tank and extending downward within the tank is a circuit closer shown in detail in Fig. 3. This circuit closer comprises a rod $h$, a sleeve $i$ of insulating material surrounding the rod, a metal sleeve $k$ surrounding the insulating sleeve and a collar $m$ of insulating material surrounding the metal sleeve and seated in a hole in the tank top. When either tank is connected with vacuum the milk flows thereinto until it reaches the level shown by the dotted horizontal line $x$ in tank $a$, whereupon rod $h$ and sleeve $k$ are electrically connected through the top layer of milk.

$n$ is a generator or other source of electrical current. One pole of the generator is connected through lines 2 and 2', with the rods $h$ of the respective circuit closers. The other pole of the generator is connected, through lines 3 and 3', with the sleeves $k$ of the respective circuit closers. In the respective lines 3 and 3' are electro-magnets 4 and 4'. A mercury switch $o$ is so positioned between the magnets 4 and 4' that when magnet 4 is energized the switch $o$ will be rocked to close a circuit through a line 5', while when magnet 4' is energized, the switch $o$ will be rocked to close a circuit through line 5. In these circuits are included electromagnets, one of which is shown in Fig. 2. This magnet is enclosed by a casing mounted on the connector $f$ or $f'$. Each connector comprises a body $p$ carrying a tube $x$ and having an air passage 10 communicating through tube $x$ with the hose $g$ or $g'$. Mounted on the body $p$ is a magnet casing $s$ enclosing a magnet winding $r$ one end of which is electrically connected with the cover of the magnet casing, while the other end is connected with the magnet core $q$. The inner tubular member of the magnet casing is adapted to slip over the nozzle $e$ or $e'$ on the vacuum pipe $d$. This nozzle carries a contact finger $t$ which is mounted on and insulated from the nozzle $e$ or $e'$. Contact finger $t$ engages the cover of the magnet casing when the latter is slipped into engagement with the nozzle. If the mercury switch through either line 5 or 5' is closed, the current flows through the corresponding contact finger $t$, magnet $r$, the connector and vacuum pipe $d$.

The body $p$ and the magnet casing $s$ are provided with opposing valve seats between which is a disc $v$ functioning both as an armature and as a valve. Body $p$ is provided with a vacuum passage 11 opening in its valve seat and connected with the vacuum passage 13 enclosed by the inner tubular wall of the magnet casing $s$. The magnet casing is provided with a passage 12 connected with the atmosphere and opening in its valve seat. When the magnet $r$ is energized, it pulls valve $v$ against the upper valve seat, thereby connecting the corresponding hose $g$ or $g'$, through passage 10, the valve chamber, passage 11 and the central passage 13 through the magnet casing, with the corresponding nozzle $e$ or $e'$ on the vacuum pipe $d$. When the circuit through the corresponding line 5 or 5' is opened through the mercury switch $o$, the magnet will be de-energized, the valve $v$ will drop by the action of gravity and unbalanced air pressure, and air will flow through passage 12, the valve chamber and passage 10 into the corresponding hose $g$ or $g'$.

The construction of the device shown in Fig. 2 is more fully described in an application for patent filed by me October 1931, Serial No. 571,169 now Patent No. 1,914,123, wherein are claimed the novel and patentable features of such device. The device forms no necessary part of the present invention, since it is possible to substitute therefor other known means for electrically controlling the connection of the tanks with atmosphere and vacuum alternately.

From the foregoing description it will be understood that when the mercury switch $o$ is in the position shown in Fig. 1, the circuit is closed through line 5', the corresponding valve $v$ is lifted by its magnet $r$ into the position opposite to that shown in Fig. 2, hose $g'$ is connected with vacuum and milk flows through pipe $b'$ into tank $a'$. At the same time the circuit is open through line 5, the corresponding magnet $r$ is de-energized, valve $v$ has dropped into the position shown in Fig. 2, hose $g$ is connected with atmosphere and the valve $c$ on the end of the milk inflow pipe $b$ is closed, shutting off the flow of milk and allowing the milk which has previously filled the tank $a$ up to the level of the line $x$ to flow out of the bottom of the tank into a conduit $w$ and thence into a common receiver (not shown). The discharge funnel at the bottom of each tank is provided with a swingable closure $y$ which opens when the body of milk in the tank is under atmospheric pressure but closes, by reason of the pressure of the atmosphere against its outer face, when the hose connection to such tank is connected with vacuum. When the milk flowing into tank $a'$ reaches a level corresponding to the line $x$ in tank $a$, the circuit 2', 3' is closed through magnet 4', thereby energizing said magnet and rocking switch $o$ into its opposite position and closing the circuit through line 5. Thereupon the aforesaid described conditions are reversed, the flow of milk starts into tank $a$ and the milk starts to discharge from tank $a'$.

Where, in the claims, reference is made to vacuum and atmosphere, I mean to include as equivalents any relative low and high absolute pressures. Most conveniently and efficiently, these absolute pressures will be respectively a vacuum corresponding to an absolute pressure of about 15 inches mercury, and atmospheric pressure.

What I claim is:

1. A continuous milk delivery system comprising a pair of tanks, milk inlets to both tanks, a source of vacuum with which said tanks are adapted to be connected, electric circuits, one for each tank, means, operable when the circuit corresponding to either tank is closed, to disconnect such tank from vacuum and connect it with atmosphere and connect the other tank with vacuum and disconnect it from atmosphere, and circuit closers, one in each tank, each circuit closer comprising a depending rod connected with one pole of the circuit and a sleeve surrounding and insulated from said rod and connected with the other pole of the circuit said circuit adapted to be closed through the milk when the milk reaches a predetermined level.

2. A continuous milk delivery system comprising a pair of tanks, milk inlets to both tanks, a source of vacuum with which said tanks are adapted to be connected, an electric circuit, means, operable by said circuit when closed, to disconnect a tank from said source of vacuum and connect it with atmosphere, and a circuit closer within each tank, said circuit closer comprising spaced-apart terminals within the tank adapted to be connected through the milk when the same reaches a predetermined level within the tank.

3. A continuous milk delivery system comprising a pair of tanks, milk inlets to both tanks, a source of vacuum with which said tanks are adapted to be connected, an electric circuit, means, operable by said circuit when closed, to connect one tank with atmosphere and the other tank with said source of vacuum, and a circuit closer within each tank, said circuit closer comprising spaced-apart terminals within the tank adapted to be connected through the milk when the same reaches a predetermined level within the tank.

4. A continuous milk delivery system comprising a pair of tanks, milk inlets to both tanks, a source of vacuum, electrically actuable means adapted to connect either tank with atmosphere and the other tank with vacuum, switch mechanism adapted to reverse said pneumatic connections, electric circuits one for each tank, circuit closers, one for each tank, each circuit closer adapted to operate to close the corresponding circuit when the milk in the corresponding tank reaches a predetermined height, each circuit adapted when closed to operate said switch mechanism, each circuit closer comprising spaced-apart terminals within the tank adapted to be closed through the milk when it reaches a predetermined level.

CYRUS HOWARD HAPGOOD.